United States Patent [19]
Nilsson

[11] Patent Number: 5,429,777
[45] Date of Patent: Jul. 4, 1995

[54] METHOD AND APPARATUS FOR MANUFACTURING OF A CONTAINER

[75] Inventor: Torsten Nilsson, Löddeköpinge, Sweden

[73] Assignee: PLM AB, Malmo, Sweden

[21] Appl. No.: 39,199

[22] PCT Filed: Dec. 21, 1990

[86] PCT No.: PCT/SE90/00864
§ 371 Date: Apr. 12, 1993
§ 102(e) Date: Apr. 12, 1993

[87] PCT Pub. No.: WO91/09723
PCT Pub. Date: Jul. 11, 1991

[30] Foreign Application Priority Data
Dec. 29, 1989 [SE] Sweden ................. 9000004

[51] Int. Cl.⁶ .............. B29B 13/08; B29B 13/00; B29C 35/08; B29C 35/02
[52] U.S. Cl. .............. 264/22; 264/25; 264/235; 264/296; 264/346; 264/521
[58] Field of Search .......... 264/296, 292, 346, 235, 264/521, 522, 535, 22, 25

[56] References Cited

U.S. PATENT DOCUMENTS

| | | |
|---|---|---|
| 4,318,882 | 3/1982 | Agrawal et al. |
| 4,375,442 | 3/1983 | Ota et al. ............... 264/521 |
| 4,871,507 | 10/1989 | Ajmera . |
| 4,943,406 | 7/1990 | Bocchi ................. 264/521 |
| 4,960,556 | 10/1990 | Oehlenschlaeger et al. ....... 264/346 |

FOREIGN PATENT DOCUMENTS

| | | |
|---|---|---|
| 282941 | 9/1988 | European Pat. Off. . |
| 296825 | 12/1988 | European Pat. Off. . |
| 2153737 | 8/1985 | United Kingdom . |

*Primary Examiner*—Catherine Timm
*Attorney, Agent, or Firm*—Keck, Mahin & Cate

[57] ABSTRACT

A method and an apparatus to thermocrystallize amorphous thermoplastic material in a bottom portion (11) of a preform (10) while producing a container. By means of at least one heating device (20, 30) the plastic material is heated to an elevated temperature at which the material crystallizes thermally. The supply of energy is discontinued once the material crystallizes at a speed entailing that the thus released effect corresponds to or exceeds that effect which departs from the material undergoing crystallization. The apparatus includes a mandrel (26) having a forming surface (24) which at an increased temperature is brought into abutment against a defining surface (18) of the bottom potion. The forming surface has a curvature which deviates from the curvature of the defining surface (18) so that during the initial phase of the abutment the forming surface is abutting against the defining surface only in a central area thereof. On continued displacement of material in the bottom portion in order to form the portion the size of the central area thermoplastic material intended for temperature-conditioning abuts against the forming surfaces.

10 Claims, 9 Drawing Sheets

METHOD AND APPARATUS FOR MANUFACTURING OF A CONTAINER

FIELD OF THE INVENTION

The present invention relates to a method and an apparatus for thermal crystallization of substantially amorphous thermoplastic material in accordance with the preamble of the independent claims.

BACKGROUND OF THE INVENTION

There is a need for containers of thermoplastic material with superior configurational stability also at high temperatures, for example for the storage of foods. In particular in applications in which pasteurization, hot-filling or sterilization occur, it is necessary that the containers, without configurational change, withstand elevated temperatures. It is also obvious that, in applications in which the containers are filled with, for example, beverages containing, for instance, carbonic acid or nitrogen gas, high pressures occur in the sealed container both in connection with the filling and during subsequent storage. In particular, it should be observed that containers filled with carbonated beverages reach very high pressures on heating. As a non-restrictive example of thermoplastic material for containers for the above-indicated purposes, polyethylene terephthalate is disclosed, hereinafter generally abbreviated to PET. The thermoplastic material PET like most of the thermoplastic materials, is int. al. characterized in that it obtains good mechanical strength properties by mono and/or biaxial orientation, the material is thermocrystallizable and that its barrier properties are as a rule sufficiently good for many applications within the food sector.

As has already briefly been disclosed above, the mono and/or biaxial orientation of the thermoplastic material entails at demands placed on configurational strength and configurational stability are achieved in those parts of the container in which oriented material is included. In the production of the container, only the material in the walls of the container body is oriented, the material being, as a rule, given biaxial orientation. However, in certain applications the material in the mouth portion of the container is also oriented. On the other hand, in most applications, the material in the bottom portion of the container is not oriented, at least not in central regions of the bottom portion. It is previously known to thermally crystallize such non-oriented material portions in order to increase configurational stability both at low temperatures and at elevated temperatures. Since the material, before the thermocrystallization, is substantially amorphous, because of the fact that the material has not been oriented or oriented to but a slight degree, the material will as a rule be of relatively great thickness, which, in many applications, essentially corresponds to the original material thickness of the blank which is in the process of being reformed into the container. The term "substantially amorphous" signifies that the material has a crystallinity of at most approx. 10%.

Because of the poor thermal conductivity of the thermoplastic material, in combination with the relatively large wall thickness, heating for a lengthy time is required in order that the material will achieve the desired crystallinity. In applications in which the material is crystallized thermally by abutment against hot tool surfaces, abutment times of the order of magnitude of 15–30 s are as a rule required. It is obvious that the long abutment times reduce production capacity of the equipment employed, which leads to un desirably high capital costs for the production of the containers.

A further disadvantage in prior art technique is that, in conjunction with thermal crystallization of substantially amorphous material in the bottom portion of a container, the material in this will have a crystallinity which varies from region to region, and in addition, in certain areas the bottom portion will also have an undesirable deformation.

The varying crystallinity is because gas mixtures, as a rule air, are enclosed between the hot tool surfaces and the thermoplastic material. The enclosed gas mixtures form pockets between the tool surfaces and the plastic material. Each pocket constitutes an insulating layer which reduces the thermal exchange between the tool surfaces and the thermoplastic material, whereby, on heating of the material, that material in the area of each respective pocket is supplied with a smaller quantity of energy than in those regions where the material abuts against the tool surfaces. Thereby, the plastic material in the region of each respective pocket will reach an insufficiently high temperature, or the requisite high temperature for such a short time that the total thermal crystallinity in the material will be far too slight. The unevenly distributed crystallinity entails that the crystalline material will have poor configurational stability in the the bottom portion.

The undesirable deformation is a consequence of the fact that the gas mixture enclosed in each respective pocket is heated, excess pressure being formed in the pocket. Since the thermoplastic material, despite the insulating effect of the pocket, reaches a sufficiently high temperature to soften, the thermoplastic material in the region of the pocket is displaced, by the excess pressure in the pocket, in a direction towards the interior of the container and/or the material is attenuated, the undesirable deformation occurring. It is obvious that the bottom portion in the thinner material regions will have reduced mechanical strength.

In those areas of the bottom portion where there is a gravure, for example a company trade mark, a patent number, etc, the above-indicated problems with insufficient and/or varying crystallinity and undesirable deformation, respectively, may readily occur.

The present invention discloses a method and an apparatus in which the above-indicated desiderata have been satisfied and the above-outlined drawbacks have been obviated.

SUMMARY OF THE INVENTION

According to the present invention, thermal energy is supplied to the originally substantially amorphous thermoplastic material by allowing this to abut against at least one hot abutment surface of good thermal conductivity during one or more relatively short periods of time. Each time the abutment against the hot abutment surfaces has ceased, thermal energy is, because of the poor thermal conductivity of the thermoplastic material, dissipated relatively slowly to the ambient surroundings. According to the present invention, the material temperature is raised by at least one heating to a temperature region within which the crystallization speed, and, thereby, the thermal effect which is released within the thermoplastic material is at least of the same order of magnitude as that thermal effect which radiates from the material once abutment against the hot abutment surface or surfaces has ceased. For example, for PET, it has proved possible to achieve a relationship between the thermal effect released within the material and the thermal effect emitted from the material which entails that the material, without continued abutment against hot abutment surfaces, retains the requisite elevated temperature for a sufficiently long time for the material to obtain the desired crystallinity. When the material is substantially amorphous, the crystallization speed is, at a given temperature, at its highest but fades at unchanged temperature according as the crystallinity of the material increases. The term substantially amorphous material is here taken to signify a material whose crystallinity at most amounts to approx. 10%.

According to one preferred practical application of the present invention, the material undergoes a crystallization cycle in which, once abutment against the hot abutment surface or surfaces has ceased, the thermal effect emitted to the ambient surroundings of the material is first less than, subsequently substantially the same as and finally greater than the thermal effect which is released when the material crystallizes. This implies that, once the abutment against the hot abutment surface or abutment surfaces has ceased, the temperature of the material will first rise, thereafter be substantially unchanged, and finally fall.

In many thermally crystallizable plastic materials, a curve showing the crystallization speed as a function of the temperature has a peak value. By the abutment against the hot abutment surface or abutment surfaces, the material temperature is adjusted at a temperature in the region of this peak value. If the material, immediately after abutment against the forming surface or forming surfaces has ceased, is at a temperature corresponding to the maximum crystallization speed of the material, and the energy released within the material at this temperature per unit of time corresponds to the energy emitted (dissipated) from the material per unit of time, the material temperature will naturally, not increase but remain at the adjusted value until such time as the material has reached such high crystallinity that the crystallization speed begins to fade. If, on the other hand, the energy released within the material per unit of time is greater than the energy emitted from the material, the material temperature will, of course, rise.

As a rule, the material properties and the environment in which the thermoplastic material exists are such that, at maximum crystallization speed, the thermal effect released in the crystallization exceeds the thermal effect emitted from the material. In one preferred embodiment of the present invention, the material temperature is, therefore, adjusted to a value which is higher than that which entails maximum crystallization. It will hereby be ensured that the temperature of the material will always pass the temperature region of maximum crystallization speed. This takes place once the material has obtained a certain thermal crystallization and, as a consequence thereof, its crystallization speed has declined. Thus, it generally applies, according to the present invention that the thermal energy which is released on the crystallization is utilized for maintaining the material at a temperature which is less than the thermal crystallization of the material even after contact between the hot abutment surface or abutment surfaces and thermoplastic material has ceased.

In application of the present invention to PET of a given quality experiments have shown that, if the substantially amorphous material is heated to approx. 140° C. and the contact between the hot tool surfaces thereafter ceases, the thermal effect developed by the crystallization is insufficient to keep material at the adjusted temperature, for which reason this temperature falls. On heating to 160° C., the energy development within the material entails that the material temperature first rises or is substantially unchanged. Thereafter, the temperature falls as the crystallinity of the material increases.

The above-described intermittent supply of thermal energy to the material entails that the requisite long treatment time which was required according to prior art technology to achieve the desired level of crystallinity of the material is no longer decisive for the cycle time of those part phases of which the production process for the container is composed. In applications in which the blank is displaced between mutually subsequent treatment stations, the material is heated, in applications where only one heating occasion gives insufficient temperature for the material, in one or more heating stations which follow after the first heating station. Between each such heating occasion, the material is allowed to be free from contact with heating devices. In each such heating station thermal energy is transferred to the material of the blank by abutment against hot abutment surfaces during a time which is adapted to the cycle time in the station. Of the supplied energy, the major portion migrates into the material. By the repeated heating occasions with interjacent phases of cooling energy migration within the material, there will be achieved, in certain applications, a more uniform heating profile in cross section through the material than can be achieved according to prior art technology, i.e. a heating profile with a substantially uniform temperature distribution.

In the initial phase of crystallization of the substantially amorphous thermoplastic material, a material is relatively soft, since its crystallinity is low and the material is at a temperature which exceeds Tg by a comfortable margin. According to the invention, in concave abutment surfaces of the thermoplastic material which is to be heated, the abutment surface of the apparatus with whose aid the material of the blank or an intermediate preform is heated is allowed to be more curved than the concave abutment surface (of the preform) which defines the material which is to be heated. Hereinafter, the word blank will be employed to designate both a blank and a preform. In physical applications in which the concave abutment surface of the blank forms the outer defining surface of the bottom of the blank, the hot abutment surface of the apparatus, hereinafter also designated tool surface, and blank are brought, by relative movement, into contact with one another, contact being first established in a central region of the outer bottom surface of the blank. This region is displaced by the tool surface towards the inner centre of the blank in order to assume a final position, at the same time as the abutment surface of the tool against the thermoplastic material continuously increases in that the tool surface is continuously brought into contact with the bottom surface increasingly closer to the transition of the bottom surface into the wall portion,. This implies that the bottom portion of the blank is displaced towards the interior of the blank, that the lower bottom surface of the blank in all parts reaches contact with the hot tool surface, and that the successive extension of the contact region towards the transition into the wall portion of the blank prevents, for example, air from being entrapped between the tool surface and the plastic material in the bottom portion. The abutment surface of the apparatus (the tool surface) defines material, for example metal, with good thermal capacity.

In physical applications in which the heating of a thermoplastic material is commenced in that the hot tool surface is moved into contact against a convex abutment surface of a thermoplastic material, the abutment surface of the heating device is selected to be less curved than that of the thermoplastic material in order to achieve a corresponding elimination of blister formation between the plastic material and the heating device. This embodiment is, as a rule, put into use when the heating device is moved into abutment against the inner surface of a bottom portion.

In certain physical applications, the thermoplastic material in the blank is heated from both sides. In such instance, the apparatus includes a device, for example an inner mandrel or an outer abutment, comprising material of good thermal conductivity, for example metal, and with a defining surface which is displaceable to and from an adjustable working position, in which the defining surface of the device makes a gap with the abutment surface (tool surface) of the apparatus. In the working position, the gap width at most corresponds to the material thickness of the thermoplastic material which is to be heated. The device is moved to its working position only when the tool surface of the apparatus has been displaced to its final position. It will hereby be ensured that no pockets are formed enclosing gas mixtures between the material of the blank and the defining surface of the device, and thereby a good abutment between the thermoplastic material and the defining surface of the device.

In a finishing treatment stage, the material in the bottom portion is brought into abutment against one or more calibration surfaces of material with good thermal conductivity, for example metal. The calibration surfaces are, in this instance, of a configuration which corresponds to the desired finished configuration of the bottom portion of that container which it is intended will be produced from the blank. The relationship between the curvature of the plastic material and the curvature of the calibration surfaces is, in this instance, the above-described. The calibration surface or surfaces, respectively, are at a temperature which is less than the glass conversion temperature (Tg) of the material, whereby the hot plastic material is, by abutment against the calibration surface or surfaces, respectively, cooled, at least in each respective surface layer, to a temperature below Tg. Once again, the relatively poor thermal conductivity of the material is utilized in order to give the soft and warm material the desired configuration by abutment against the calibration surface or surfaces, respectively, which are at a temperature entailing that the thermoplastic material would, at a corresponding temperature, be rigid and very difficult to shape. The reforming (calibration) of the bottom portion is, as a rule, wholly completed before the material in a central layer of the bottom portion reaches such low temperatures that it is no longer workable. The crystallinity of the formed material is high and the sought-for mechanical stability even at high temperatures has been achieved. Disfigurations caused by blister formation are eliminated.

BRIEF DESCRIPTION OF THE DRAWINGS

The present invention will now be described in greater detail herein below, reference being had to a number of drawings, in which.

DETAILED DESCRIPTION OF THE PREFERRED EMBODIMENTS

Figure 7:
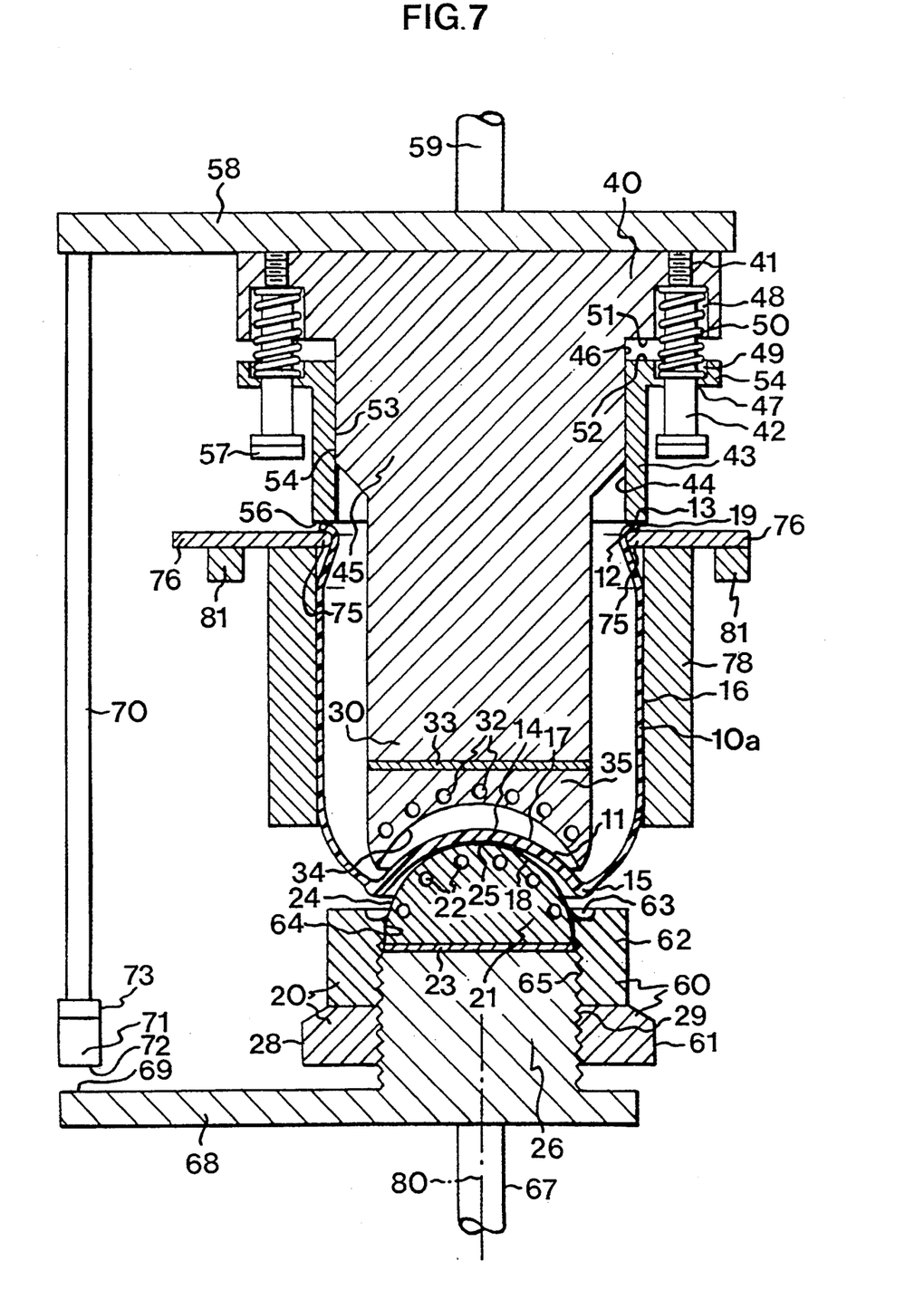
FIG. 7 is an axial cross section corresponding to that of FIG. 6, in which the final forming of the bottom portion has been commenced in that an outer device has been displaced into contact with the central bottom region of the preform.
Figure 8:
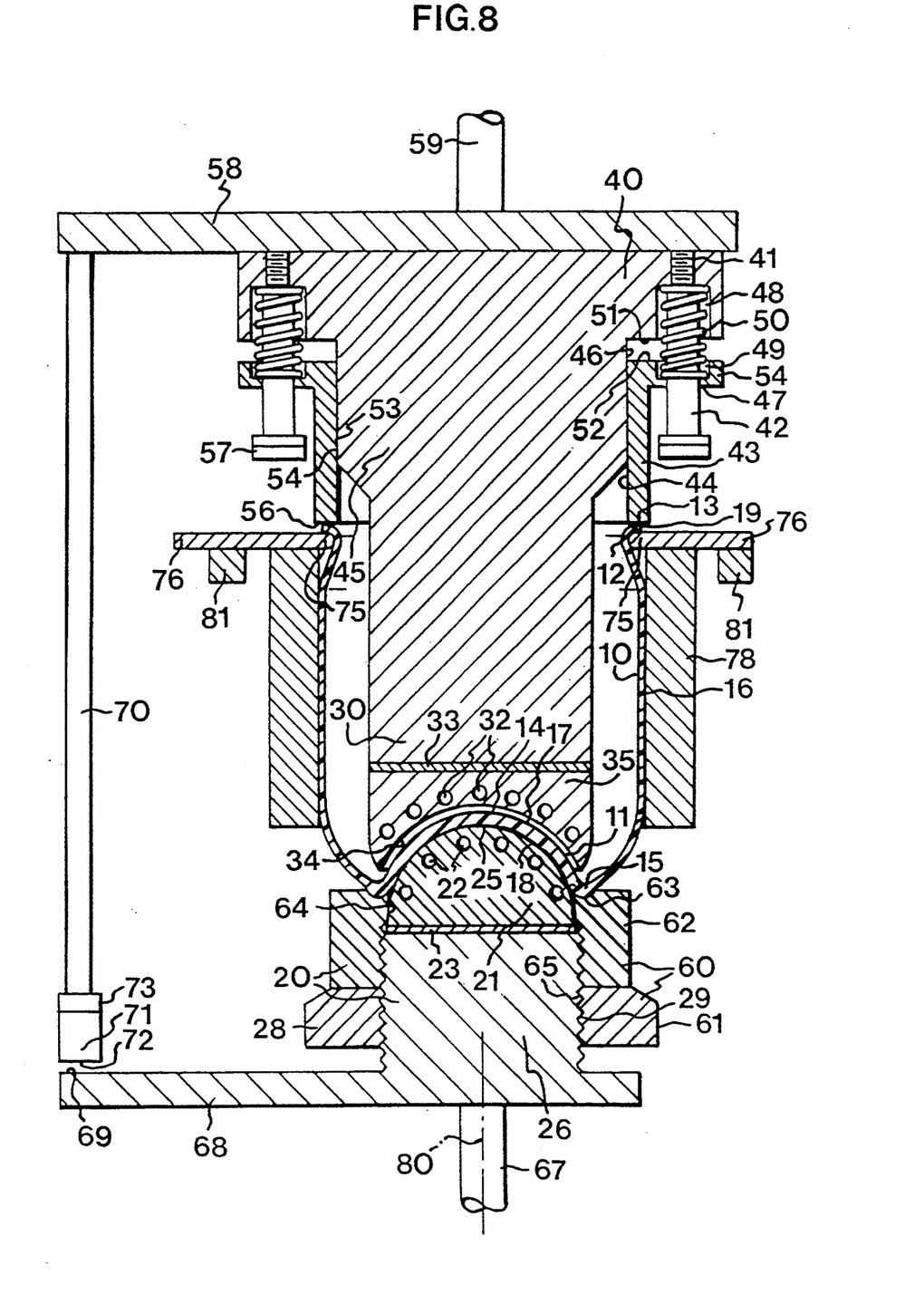
FIG. 8 is an axial cross section corresponding to that of FIG. 6, in which the forming of the bottom portion has been completed in that displacement of the bottom portion towards the centre has been completed.
Figure 9:
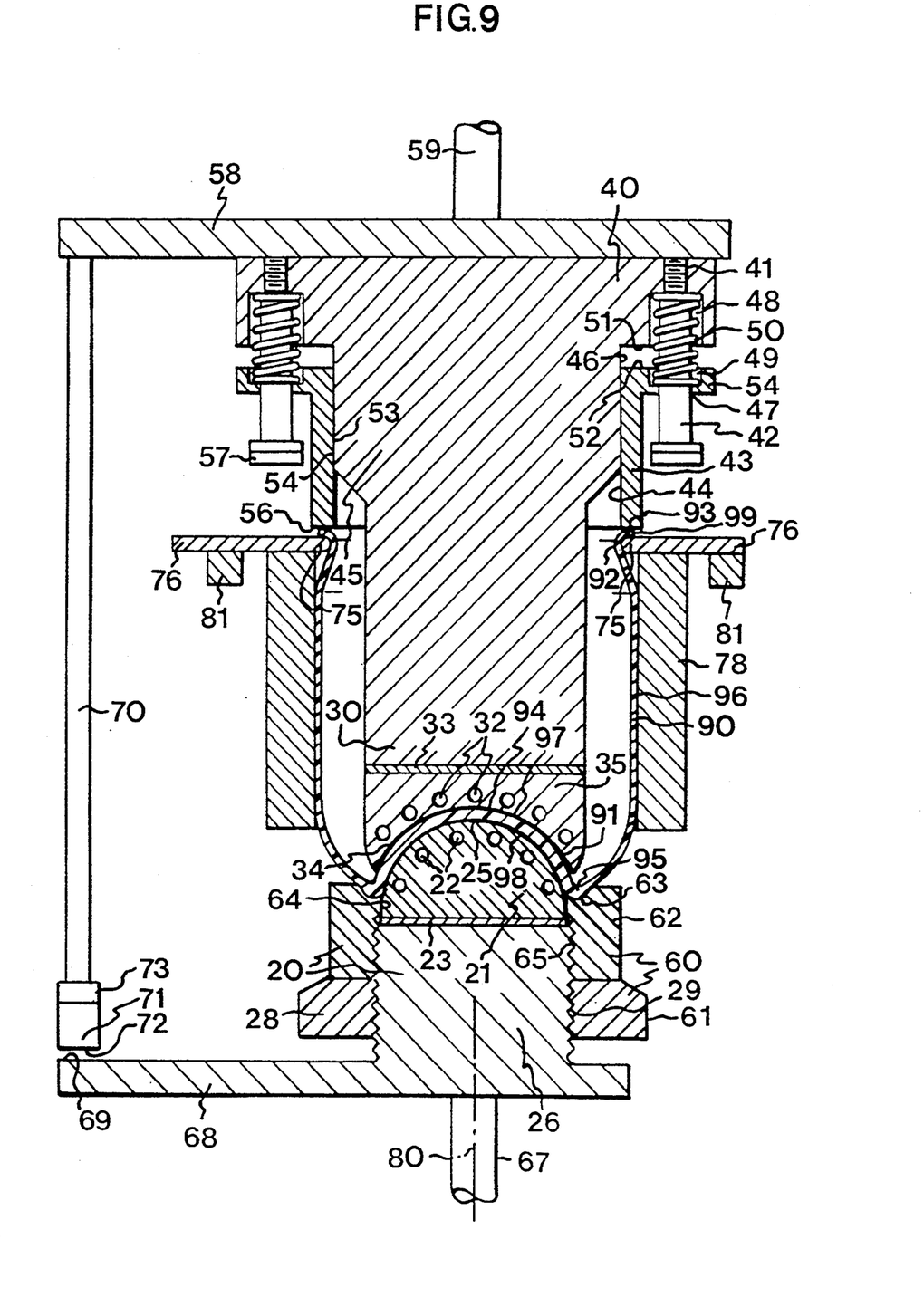
FIG. 9 is an axial cross section corresponding to that of FIG. 6, in which an inner heating device has been moved into abutment against the bottom portion of the preform.

Referring to the drawings, FIGS. 1-9 illustrate one embodiment of the invention, there being shown in FIGS. 1-8 a preform 10 and, in FIG. 9 a container 90 with a closed bottom portion 11 and 91, respectively, a mouth portion 12 and 92, respectively, with a discharge edge 13 and 93, respectively, and a container body 16 and 96, respectively, disposed between the mouth portion and the bottom portion. In the embodiment of the preform shown in the figures, the mouth portion is designed with a flared flange 19, 99, respectively, defined by the discharge edge 13 and 93, respectively. In the illustrated embodiment, the bottom portion is provided with a standring 15 and 95, respectively, in which the bottom portion merges into the container body 16 and 96, respectively. Inside the standring, the bottom portion has a bottom part 14 and 94, respectively, with a defining surface (inner defining surface) 17 and 97, respectively, facing towards the centre of the preform, and the defining surface (outer defining surface) 18 and 98, respectively, facing away from the centre of the preform.

The embodiment of an apparatus according to the present invention shown on the drawings includes a frame 81, and an inner device 30, occasionally designated upper device, and an outer device 20, occasionally designated lower device. The upper and the lower device constitute, in FIGS. 1–4, heating devices and, therefore, will hereinafter be designated (when the devices in these figures are intended) generally inner heating device and outer heating device, respectively, while the lower and upper device in FIGS. 6–9 constitute cooling devices and will, therefore, hereinafter be designated (when the devices in these figures are intended) generally as inner cooling device and outer cooling device, respectively. In the described embodiment, the heating devices and cooling devices are of complementary design, but their action is determined by whether energy is supplied to the devices or removed from them. The heating devices may emit radiation energy.

The inner device 30 includes a substantially cylindrical member 55 which comprises a lower portion 31 and an upper portion 40. As a rule, the upper portion is removably connected to a holder device 58 which, in its turn, is connected via a shaft 59 to drive means (not shown) for displacing the inner device 30 between a position where its lower portion 31 is located within the preform 10 or the container 90, respectively, and a position where the lower portion is located outside the preform or container, respectively. The upper portion 40 of the cylindrical member 55 has a central portion 45 which is surrounded by an upper sleeve 43 which is displaceable in the axial direction of the cylindrical member. The upper sleeve has an inner defining surface 44 whose dimensions are adapted to the dimensions of an outer defining surface 46 of the central portion, so as to form a journal 53 in which the upper sleeve has been displaced in relation to the cylindrical member. The upper sleeve 43 is also provided with a generally circumferential abutment surface 56 for cooperating with the discharge edge 13 of the preform 10 when this has been placed in the apparatus. The abutment surface has at least one portion which is directed downwardly in the figures and is disposed to abut against the upwardly directed edge of the preform or the defining surface of the upper definition 13 of the mouth portion.

The upper sleeve 43 has a flange portion 54, generally a circumferential such portion, in which there is disposed a number of journals 47. A bolt 42 with a downwardly facing bolt head 57 is disposed in each such journal and with its outer threaded portion 41 is secured in the upper portion 40 of the cylindrical member. This upper portion has, like the flange, recesses 48 and 49, respectively which face towards one another and whose dimensions are adapted so as each to accommodate their end portion of a spring 50 which surrounds the bolts 42. Each such bolt is fixed to the upper portion 40 by means of the threaded portion 41 and is disposed, on displacement of the cylindrical member 55 in relation to the upper sleeve 43, to be shifted in the journal 47 of the sleeve.

The lower portion is provided with a concave abutment surface 34 facing downwardly in the figures. Channels 32 for thermal medium are provided in the cylindrical member for adjusting the temperature of the concave abutment surface. In the embodiment illustrated in the figures, the portion 35 provided with channels is, by means of a thermal insulation 33, discrete from remaining parts of the lower portion.

A positioning device 78 is provided to orient the preform into the correct position, i.e. to adjust the preform in the correct position at least laterally and correct orientation in relation to those devices which act on the preform in the different treatment stages when the present invention is reduced into practice. In one preferred embodiment, the positioning device is provided as a substantially cylindrical sleeve which is open at both ends.

In the illustrated embodiment, holders 75 are also included whose mutual spacing is adapted to the throat which the preform has beneath the discharge edge. As a rule, the holders are removably connected with the positioning device. Hereby, the advantage will be afforded that the dimensions and mutual spacing of the holders are independent of the dimensions of the positioning device, whereby the equipment may readily be adapted to the dimensions of the preform/the container, on modification of the dimensions of those containers being produced. The holders support the preform on those occasions during the production process when it is not supported by other devices in the apparatus. In one preferred embodiment, the holders form a path 76 against which the preform abuts with its discharge flange 19 and along which path the preform is displaced to mutually subsequent stations in which the different treatment stages are carried out. As a rule, this path forms, in such instance, part of a circle periphery in whose broken regions the preform is supplied to the path and the container departs therefrom. In this instance, the positioning device 78 is generally also employed as displacement device, for displacing the preform between the different treatment stations. In those embodiments in which the positioning device is designed as a sleeve open at both ends, the preform is allowed, in certain physical applications, to depart from the sleeve through its bottom opening once the preform has completed the final treatment stage and the container has been produced. Most simply, this is effected in that the preform quite simply is allowed to drop by force of gravity in that the path 76 comes to an end.

The outer device 20 includes a lower sleeve 60 with a lower portion 61 and an upper portion 62 which form two mutually separate movable units. The upper part 62 of the lower sleeve has a circumferential groove 63 whose dimensions are adapted to permit the groove to receive the stand ring 15 of the preform. The lower sleeve surrounds a lower mandrel 26 which, in the embodiment shown in the figures, is connected via a shaft 67 to drive means (not shown) for displacement of the mandrel 26 and therewith the outer device 20 in the axial direction of the mandrel. The mandrel is provided with an outer thread 29, and both the lower part 61 of the lower sleeve and its upper part 62 have a corresponding inner threads 65 and 66, respectively, whereby those parts of the sleeve are displaceable in relation to the lower mandrel. The position of the mandrel is thereby adjustable in relation to the lower sleeve 60 and is locked once it has been adjusted, in that both parts 61, 62 of the sleeve are rotated towards one another (the lock-nut principle).

The lower mandrel 26 has an upper part which forms a tempering portion 21 of the outer device. The tempering portion is defined by a convex forming surface 24 facing towards the inner device and whose central part or centre portion has been given reference numeral 25.

The form (configuration) of the convex forming surface is substantially in correspondence with the form (configuration) of the concave abutment surface 34 of the upper device 30. Furthermore, the forming surface and the abutment surface have a corresponding geometric centre axis 80. Channels 22 for thermal medium are provided in the tempering portion for adjusting the temperature of the convex forming surface. As a rule, a thermal insulation 23 is provided, so as to reduce transfer of thermal energy between the tempering portion and the rest of the mandrel.

The lower device 20 is provided with an abutment member 68 with an abutment surface 69. The abutment member cooperates with a spacer 70 fixed to the holder 58 of the inner device 30. This spacer has an abutment surface 72 whose position is adjusted by means of a spacer element 71. The position of the spacer element is fixed after adjustment by means of a locking member 73. In the figures, there is shown one embodiment in which the spacer element is designed as an interiorally threaded sleeve and the locking member as a lock-nut, which both cooperate with a thread of the spacer 70 disposed parallel with the geometric axis direction of the forming surface 20 and abutment surface 34, respectively. The position of the abutment surface 72 of the spacer 70 determines the minimum distance between the convex forming surface 24 of the outer device 20 and the concave abutment surface 34 of the inner device 30. The configurations of the convex forming surface and the concave abutment surface are mutually adapted so that, with the surfaces in the position most proximal one another, a gap is formed between the surfaces, with a gap width at most corresponding to the thickness of the bottom portion 11 of the preform and, as a rule, generally corresponding to the material thickness of the bottom portion.

Figure 5:
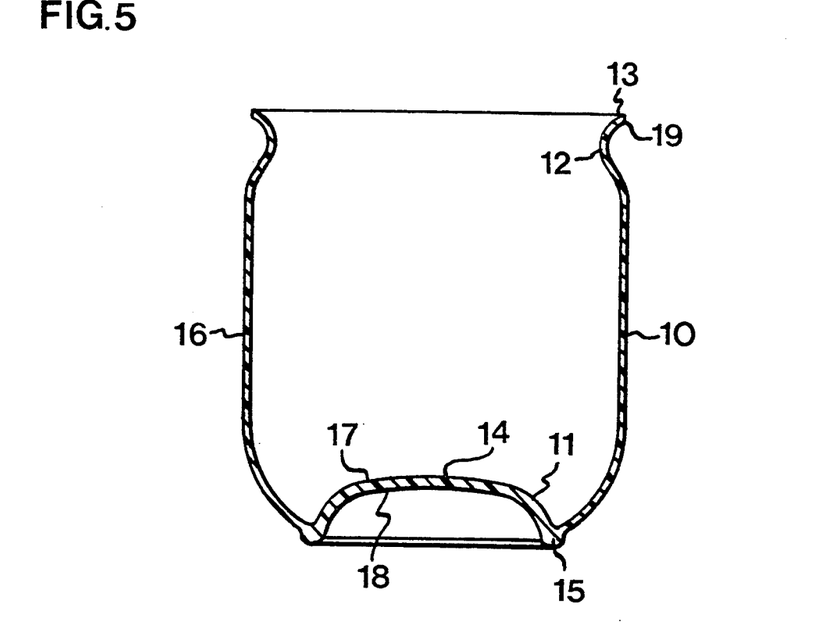
FIG. 5 is an axial cross section through a preform whose bottom portion, after heating to a temperature above Tg, has been deformed in the absence of mechanical support surfaces.

FIG. 5 shows examples of the form of the bottom portion of the preform once the preform, after heating of the material of the bottom portion to a temperature in excess of Tg, has been released from abutment against the convex forming surface 24 and, where applicable, the concave abutment surface 34. In this instance, the bottom portion of the preform is at a temperature in excess of Tg and is in the process of being displaced to a subsequent treatment stage.

Figure 10:
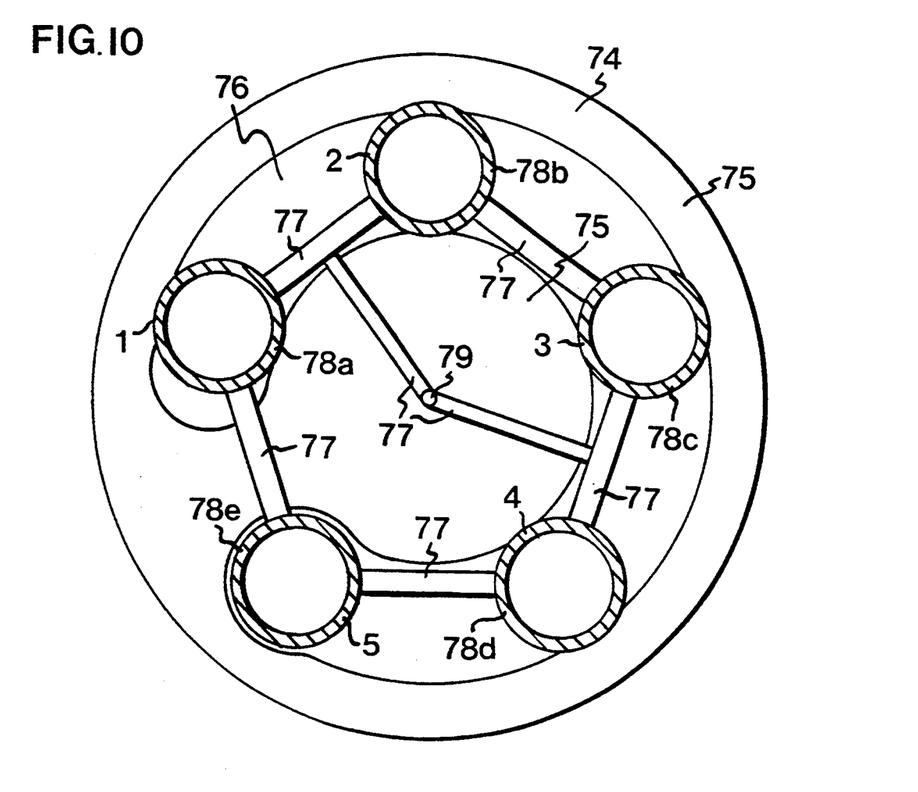
FIG. 10 is a section corresponding to the section A—A in FIG. 1 of an apparatus for receiving, temperature conditioning and calibration of the preform.

FIG. 10 shows one embodiment of the present invention in which the holders 75 are disposed as a plate 74 in which the path 76 is accommodated. The figure shows counterparts to the section along the line A—A in FIG. 1, with the inner device and the preform removed. Five positioning devices 78a–e are shown in the figure. The positioning devices are fixed to one another via connection means 77 and a cohesive unit. The cohesive unit is, via connection means, connected to a centre shaft 79 about which drive means (not shown) rotate the unit to determined positions in which the above combinations of devices described with particular reference to FIGS. 1–9 are formed.

In certain physical applications, the centre shaft is fixedly connected to the cohesive unit for rotating this. The rotational movement about the centre of the cohesive unit is, in such instance, indexed so that the positioning devices 78a-e are located, during a prior adjustable interval, in one of the positions indicated by reference numerals 1–5. Displacement of the positioning devices to the positions 1–5 is effected by relative movement in relation the plate 74 which, as a rule, is in a fixed position. In the position 1, the preform 10 is received by the positioning device 78a and is kept in place by the holders 75, i.e. the preform hangs on those edges which the plate 74 forms to the path 76 accommodated in the plate.

On rotation of the cohesive unit, each positioning device displaces the preform placed in the positioning device along the path 76 at the same time as the preform, with its mouth edge, is suspended in the edges of the path. In the deposit position 5, the distance between the edges of the path has increased, which entails that the preform, when the positioning device assumes this position, is no longer supported by the holder 78a (the edges of the path) but instead falls down from the apparatus.

Figure 1:
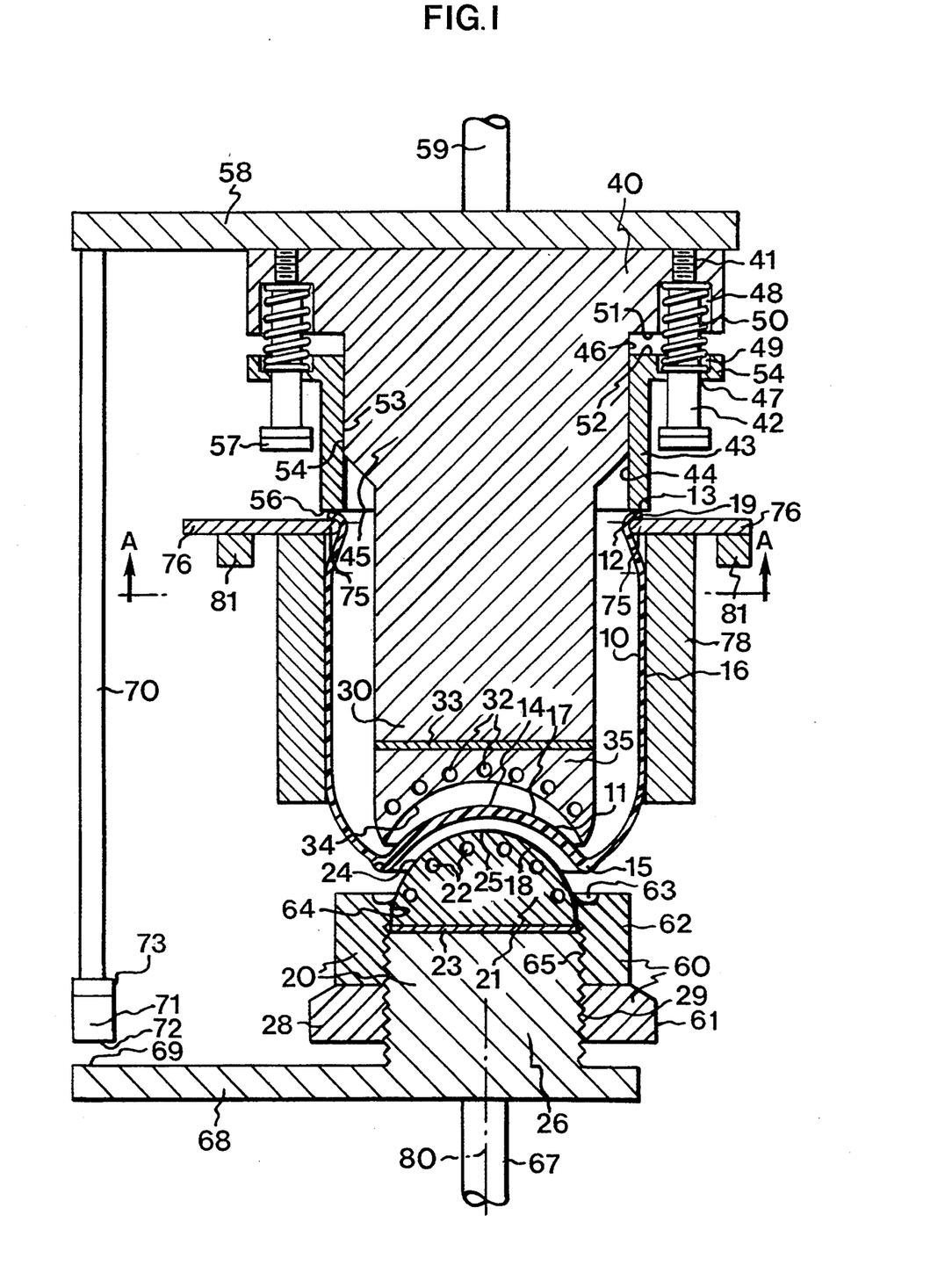
FIG. 1 is an axial cross section through a fundamental apparatus in which the apparatus is in a position to commence heating of the material in the bottom portion of a preform.
Figure 2:
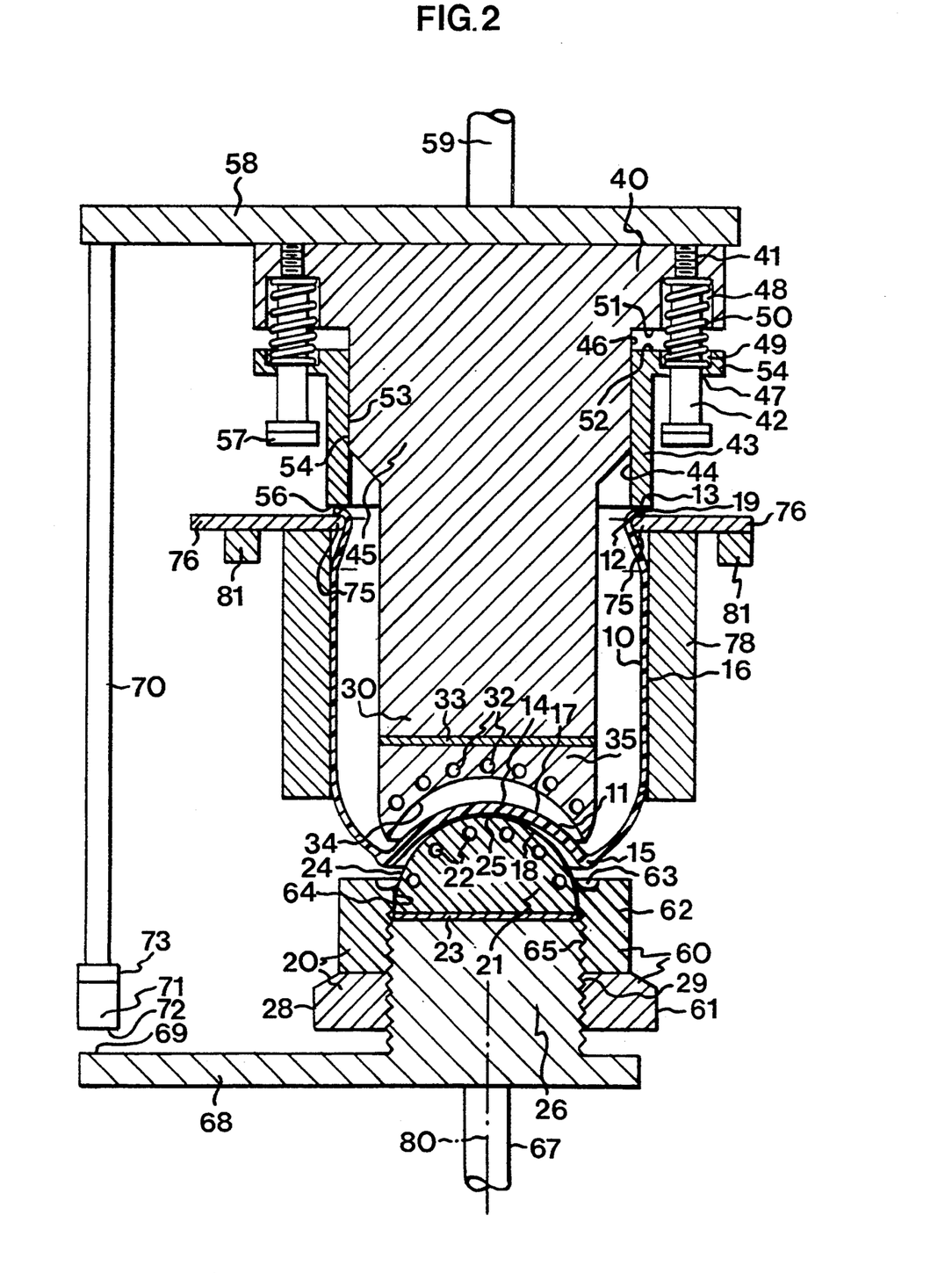
FIG. 2 is an axial cross section corresponding to that of FIG. 1, in which the outer heating device has been displaced into contact with the central bottom region of the preform.
Figure 3:
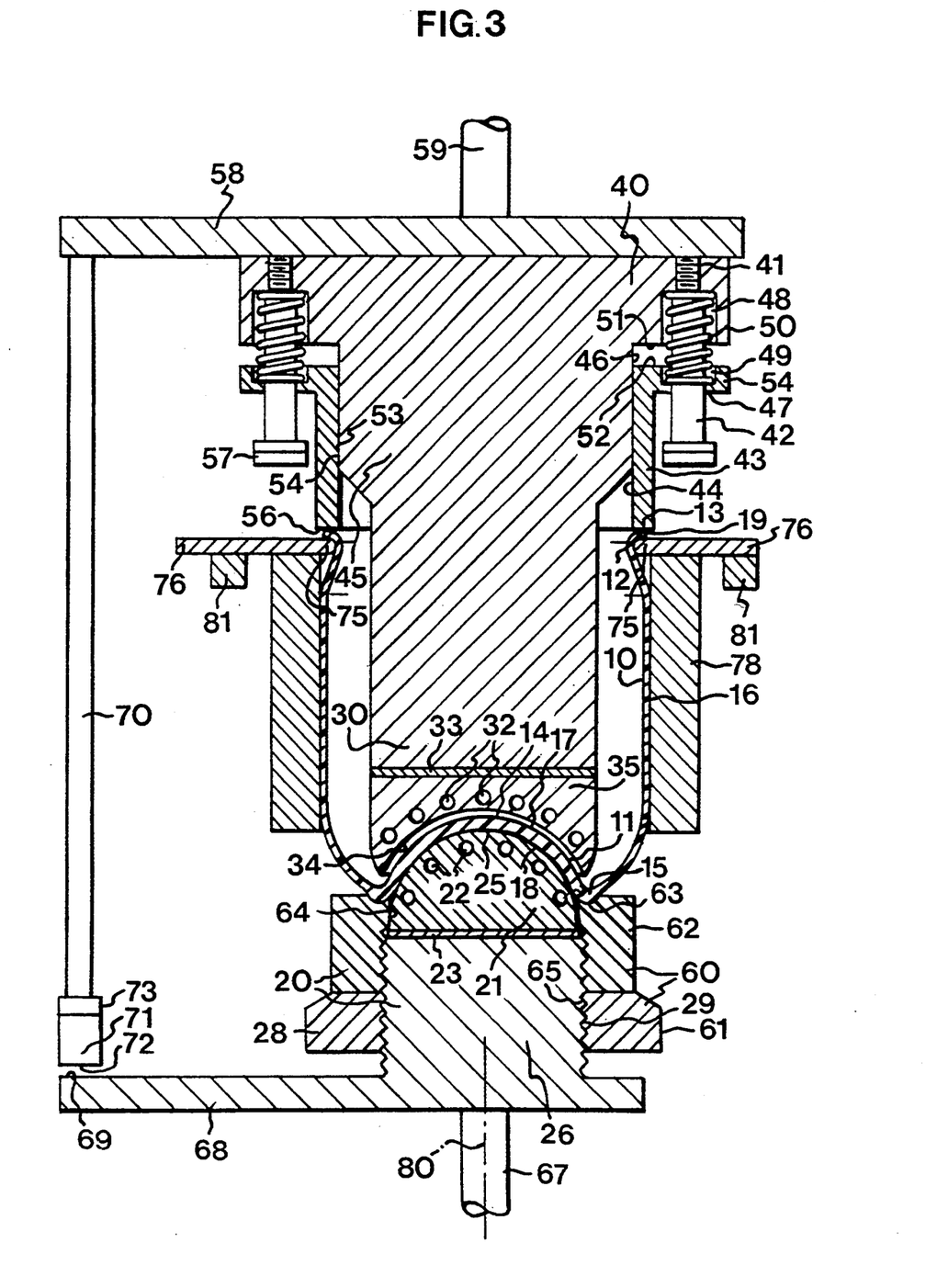
FIG. 3 is an axial cross section corresponding to that of FIG. 1 in which the outer heating device has displaced the bottom portion of the preform towards the centre of the preform.
Figure 4:
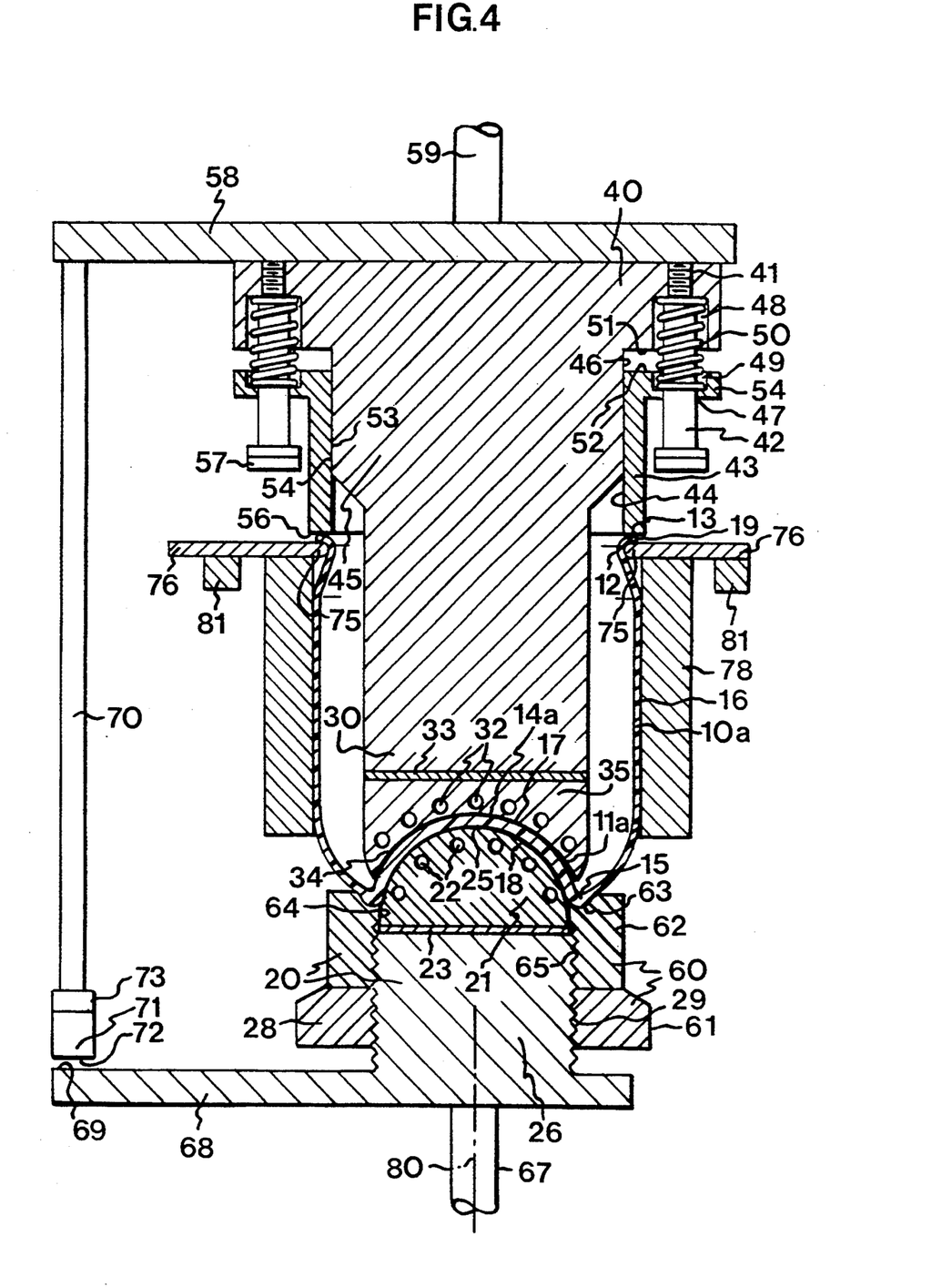
FIG. 4 is an axial cross section corresponding to that of FIG. 1, in which an inner heating device has been moved into abutment against the bottom portion of the preform.
Figure 6:
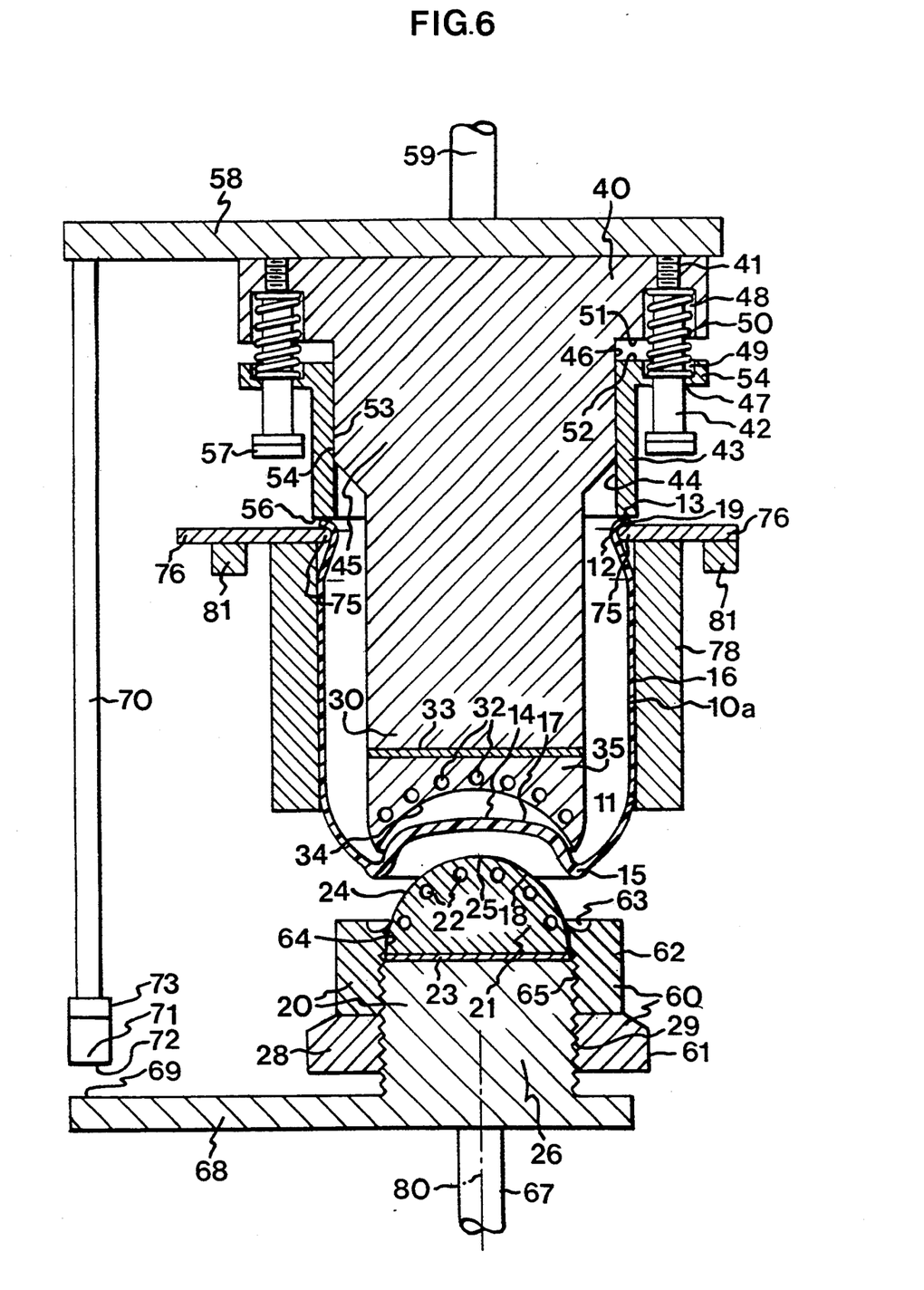
FIG. 6 is an axial cross section corresponding to that of FIG. 1, with the preform according to FIG. 5 inserted in an apparatus for final forming (calibration) of the bottom portion of the preform.

When the present invention is reduced into practice, that preform which is to be treated is placed in the apparatus (cf. FIGS. 1, 6 and 10). In this instance, the holders 78 align the preform and hold it in a position which corresponds to the position illustrated in FIG. 1, i.e. no area of the bottom portion of the preform is in contact either with the convex forming surface 24 of the outer device 20 or the concave abutment surface 34 of the inner device 30. The channels 22, 32 for thermal medium are supplied with, for example, liquid at elevated temperature, or contain electrical heating coils which are energized, whereby the devices 20, 30 constitute heating devices. Since the material in the bottom portion of the preform does not abut either against the convex forming surface 24 or the concave abutment surface 34, it will be ensured that in the subsequent heating, complete control will be established for the abutment times between the material in the bottom of the preform and the forming surface 24 and abutment surface 34, respectively, of the heating devices.

By means of the shaft 47, the lower heating device 20 thereafter displaces its forming surface 24 upwardly, the discharge edge 13 of the preform being brought into abutment against the abutment surface 56 of the upper sleeve 43 (cf. FIG. 2) under continued displacement, and under the counter-directed action of the spring force from the springs 50, the convex forming surface of the lower heating device is moved upwardly in the figure, the central bottom part 14 of the preform being displaced towards the interior of the preform. The material in the bottom portion is heated simultaneously by the forming surface, but is at a relatively low temperature, at least during the initial phase of the abutment of the forming surface, for which reason a part of the upward movement of the heating device is accommodated by the springs 50 in that the upper sleeve 43 is displaced upwardly. As a rule, the preform returns to that position illustrated in FIG. 3 when the material in the bottom portion has softened as a result of heating of the material.

In certain physical applications in which the axially-directed forces which are transmitted by the preform to the upper sleeve are great, the abutment surface 56 of the upper sleeve 43 is disposed as a circumferential abutment surface, in order to abut substantially sealingly against the opening edge in all parts thereof. In this latter application, an enclosed space is formed within the preform, this space being, in certain embodiments, pressurized in order to stabilize the form of the container body 16 and the mouth portion 12 during the continued treatment of the preform. On upward displacement in the figure of the lower heating device, the bottom portion of the preform is brought into progressively increasing contact surface with the lower forming surface 20.

The convex forming surface 24 of the lower forming device is more curved than the concave outer defining surface of the bottom portion, which (as has already been disclosed) entails that, on commencement of the abutment, the forming surface abuts only against a region in the centre of the central bottom part of the bottom portion. The forming surface is at a temperature in excess of the glass conversion temperature of the material and is kept at this temperature by means of thermal medium in the channels 22. The temperature of the forming surface is, on treatment of containers of polyethylene terephthalate (PET), preferably at least 100° C., as a rule at least 115° C. The temperature is maximum 260° C. and, as a rule, maximum 200° C. In most physical applications, PET is worked at temperatures in the range of between 140°–200° C. The temperature of the thermoplastic material is adjusted at values which are adapted to cycle times, the thickness of the plastic material, etc in order, generally speaking, to adjust the material at a temperature in the region of maximum crystallization speed or at a temperature exceeding the temperature for maximum crystallization speed.

In the progressive upward displacement of the convex forming surface 24 in the figure, the central part of the bottom portion is urged towards the centre portion 25 of the convex forming surface, at the same time as the bottom portion, according as the convex forming surface is displaced upwardly in the figure, is given a steadily more curved configuration. Hereby, the concave defining surface of the bottom portion is brought into abutment against the convex forming surface to a continuously increasing degree so that, after completed displacement (reforming), substantially the whole of the defining surface of the bottom portion abuts against the convex forming surface. In this position, the stand ring 15 of the preform has also been moved into the groove 63 of the lower sleeve. As a result of the continuously increasing extent of the abutment between the defining surface and the convex forming surface, undesired entrapment of gas, for example air, between the defining surface and the forming surface will be avoided.

According to one preferred embodiment, once reforming of the bottom portion has been completed, displacement of the convex forming surface continues upwardly in the figure, or alternatively the concave abutment surface 34 of the heating device 30 is displaced downwardly, whereby the inner defining surface 17 of the bottom portion is brought into abutment against the concave abutment surface. By means of thermal medium in the channels 32 of the upper heating device, the abutment surface 34 is kept at a temperature corresponding to the temperature as disclosed above for the convex forming surface 24.

The convex forming surface, and, where applicable, the concave abutment surface remain in the above-disclosed positions during a given time interval. Time intervals which have proved to entail the desired effect amount to at least 1 s., preferably at least 2 s. and as a rule at least 3 s. The abutment time is determined by employed tool temperatures, material properties of the forming surface and abutment surface, respectively, of the mechanical device, thickness of thermoplastic material, etc. This is generally selected such that the material in the bottom portion, already on the first heating occasion, and at least in layers adjacent the forming surface and adjacent the abutment surface, respectively, reaches temperatures at which the material begins to thermally crystallize. Hereby, the tacking tendencies of the material on subsequent heating occasions will be reduced. In addition, the abutment time is selected to be so short that the temperature of the plastic material in the abutment surfaces is less than the temperature at which the plastic material shows a tendency to begin to tack against the forming surface 24 and against the abutment surface 34, respectively.

Depending upon the design and construction of the apparatus, the inner and outer heating devices are thereafter moved to their starting positions with the preform still in the apparatus, the preform is moved to the next treatment station or withdrawn from the apparatus, in which event the material heated to crystallization temperature without abutting against any hot forming surface or abutment surface continues to crystallize during a given, as a rule relatively short time. As the convex forming surface or the concave abutment surface of the inner heating device 30 no longer influences the form of the bottom portion, this will change form, in which event the material in the central material part of the bottom portion is displaced from the centre of the preform. In such instance, the bottom portion assumes, for example, a form corresponding to that illustrated in FIG. 5.

The preform thereafter generally once again undergoes a treatment corresponding to that just described. In certain embodiments, this takes place with the aid of the same devices as those employed in the immediately preceding treatment, in other embodiments with the aid of devices in a subsequent treatment station included in the apparatus, and in further embodiments in a separate apparatus. In the two latter alternatives, the treatment is carried out by means of devices which are designed in a manner corresponding to that described above. In that the material during the first treatment stage has, as a rule, obtained a certain elevated crystallinity there will no longer be any tacking tendency in the material, for which reason the thermoplastic material is, during the subsequent treatments, generally permitted to abut for a longer period of time than disclosed above against the convex forming surface and concave abutment surface 34, respectively, of the inner heating device 30 and/or the devices are adjusted at a higher temperature than that of the tool surfaces at the first heating operation. It will be hereby be ensured that the plastic material rapidly achieves the requisite temperature which, depending upon the application example, is at a level slightly below, in or above the region of the maximum crystallization speed of the material. In most physical applications, the temperature of the material is adjusted at a value exceeding that which entails that the material has maximum crystallization speed. In PET the convex forming surface 24 and, where applicable, the concave abutment surface 34, are at a temperature within the range of between 140°–260° C., preferably within the range of between 150° and 200° C.

In certain physical applications, it is only necessary that the treatment be carried out once in order that the material in the bottom portion achieve the contemplated crystallinity while, in other physical applications, the treatment must be repeated one or more times. Irrespective of the number of heating occasions, the crystallization is, however, completed by a final forming stage (calibration stage) in which the outer and inner devices 20, 30 constitute cooling means. In such instance, the thermoplastic material is brought, at temperatures in excess of Tg, into abutment against the convex forming surface 24 (now cooled) and, as a rule, also against the concave abutment surface 34 (also this now cooled). At this point the material in the bottom portion is brought, in the hot state, into abutment against the convex forming surface 24 and, where applicable, the concave abutment surface 34, the temperature of these surfaces being adjusted to relatively low values, by which is taken to mean temperatures below the Tg of the material.

Since the plastic material has poor thermal conductivity, the reforming of the bottom portion described in the foregoing in conjunction with heating of the thermoplastic material will have time to proceed until the desired form is finished before the material reaches such low temperatures that it is no longer workable. The movement cycle and sequence between the movements of the outer and inner devices 20, 30 and reforming of the bottom portion correspond to that described above in conjunction with heating of the thermoplastic material in the bottom portion of the preform. As a rule, the bottom portion 11 of the preform has the configuration illustrated in FIG. 5 when the final forming stage begins.

FIG. 6 shows the preform according to FIG. 5 placed in the apparatus, FIG. 7 shows how the convex forming surface 24 has been brought into contact with the bottom portion 11 in its central region, FIG. 8 how the forming surface has been displaced to its end position and FIG. 9 how, in one preferred embodiment, the abutment surface 34 has been displaced into abutment against the defining surface of the bottom portion turned to face the centre of the preform. Once at least layers of thermoplastic material adjacent the defining surface (surfaces) of the material have assumed temperatures below Tg, the bottom portion 91 is complete and thereby also, as a rule, the container 90 proper. Generally, the temperature of the forming surface 24 and the abutment surface 34 is allowed to be relatively low, in certain physical applications at most 40° C., as a rule at most 20° C. and preferably at most 10° C. The temperature and cooling time are, naturally, also adapted to the thickness of the plastic material, the thermal conductivity of the material forming the forming surface 24 and abutment surface 34, etc. In general, the cooling times are between 2 and 4 times longer than the heating times. In certain embodiments, the time intervals for heating and cooling of the thermoplastic material substantially correspond.

The above-described abutment (in both heating and cooling) of only the central mid-part of the bottom portion against the convex forming surface at the moment of start for treatment of the bottom portion and the continuous increase of the circumference of the abutment surface so as finally to encompass all material in the bottom portion entail that, in all treatment stages, the undesired entrapment (occurring in prior art technology) of gas mixtures between the plastic material and the forming surface will be avoided.

It will be obvious to the skilled reader of this specification that, in physical applications in which the radius of curvature of the bottom portion is increased in connection with the treatment, the treatment of the bottom portion is, in each treatment stage, commenced in that the concave abutment surface of the inner heating device has a configuration which entails that the plastic material in the bottom portion will, in the commencement phase of reforming, only abut against the abutment surface in the centre thereof, and that the size of the material part of the bottom portion which abuts against the abutment surface continuously increases until such time as substantially all of the material in the bottom portion has achieved its final form. Hereby, it will also be avoided in this embodiment of the present invention that gas pockets are entrapped between the plastic material and the abutment surface during the reforming of the bottom portion. The convex forming surface of the outer heating device is thereafter moved, in certain physical applications, into abutment against the concave defining surface of the bottom portion. Since the material in the bottom portion has already been obtained in its final form, a form which corresponds to the form of the convex surface, the risk will be avoided that gas mixtures become entrapped between the convex forming surface and the plastic material.

Thus, the present invention discloses a technique for crystallization of the thermoplastic material of a bottom portion in which the equipment, in all treatment stages, is of unitary design and construction, in which tacking tendencies are avoided, in which uniform crystallinity in all parts of the bottom portion is obtained, in which high and controlled crystallinity are achieved in the bottom portion, and in which the bottom portion obtains an exact form (shape) and high mechanical and thermal stability. In addition, long abutment times are avoided, which entails that the cycle times for the equipment are kept down and production capacity increases in relation to prior art technology.

In order to simplify the description, the terms inner and outer or upper and lower, respectively, have been employed with no restrictive implication, together with corresponding references to the accompanying drawings. It will be obvious to the skilled reader, however, that the spatial orientation of the described apparatuses and devices may be optional.

The above detailed description has referred to but a limited number of embodiments of the present invention, but the skilled reader of this specification will readily perceive that the present invention accommodates a large number of embodiments without departing from the spirit and scope of the appended claims.

I claim:

1. A method for producing a container from a preform of plastic material, comprising the steps of:
 a) thermally crystallizing a bottom portion of said preform, said bottom portion comprising a substantially amorphous thermoplastic material,
 b) heating said thermoplastic material to an elevated temperature using at least one mechanical heating device which supplies energy and comprises a first mechanical heating device, wherein said thermoplastic material in said bottom portion comprises a concave boundary surface which, during an initial phase of the heating of said thermoplastic material, is displaced by a convex forming surface of said first mechanical heating device which is of greater convex curvature than the curvature of said concave boundary surface during a continuous increase of that region of the thermoplastic material which engages said convex forming surface, until substantially all the thermoplastic material intended for heating engages said convex forming surface,
 c) adjusting the temperature of said thermoplastic material, at least in one layer adjacent a boundary surface of said thermoplastic material, to a temperature at which the material crystallizes thermally, d) keeping said thermoplastic material at said crystallization temperature, e) discontinuing the supply of energy from said at least one mechanical heating device to said thermoplastic material once the material has been heated to a predetermined temperature, f) crystallizing said thermoplastic material, once the energy supply has been discontinued, at such a rate that energy released within the material by crystallization substantially corresponds to, or exceeds, the energy emitted from the material undergoing crystallization to its surroundings, g) shaping said thermoplastic material to its final shape using at least one mechanical cooling device in a final treatment stage for forming said bottom portion of said container, and h) cooling said thermoplastic material by means of said mechanical cooling device, at least in one layer adjacent said at least one cooling device, to a temperature below the glass transition temperature (Tg) of said thermoplastic material.

2. A method as claimed in claim 1, wherein, in step (b), at least one said mechanical heating device emits radiant energy.

3. A method as claimed in claim 1, wherein said thermoplastic material, after heating to said elevated temperature, is brought into engagement with a thermally insulating material.

4. A method as claimed in claim 1, wherein said thermoplastic material is heated to at least a temperature corresponding to the temperature at which the thermal crystallization rate is at a maximum.

5. A method according to claim 1, wherein said thermoplastic material is heated to a temperature slightly below the temperature at which the thermal crystallization rate is at a maximum.

6. A method is claimed in claim 4, wherein said devices heating said thermoplastic material are heated to a temperature exceeding the temperature at which the thermal crystallization rate of the material is at a maximum.

7. A method as claimed in claim 1, wherein said boundary surface of said thermoplastic material engages cooling surfaces of said mechanical cooling device, and said thermoplastic material, in at least one layer most proximal to said boundary surface, is cooled to a temperature below the glass transition temperature (Tg).

8. A method as claimed in claim 1, wherein once said convex forming surface of said first mechanical heating device has been displaced to its end position, a concave abutment surface of a second mechanical heating device is displaced to a working position in which said concave abutment surface forms a gap with said convex forming surface, having a gap width which, in each region of said gap, amounts at most to the thickness of said thermoplastic material before said concave abutment surface is brought into contact with said thermoplastic material.

9. A method as claimed in claim 1, wherein, in a final treatment stage, said concave boundary surface of said bottom portion is brought into engagement with said forming surface of said first mechanical heating device of greater convex curvature, the temperature of said forming surface being adjusted to a value below the glass transition temperature (Tg) of said thermoplastic material, during a continuous increase of that area of said thermoplastic material which engages said forming surface, until substantially all the thermoplastic material intended for cooling engages said convex forming surface.

10. A method as claimed in claim 8, wherein, once said convex forming surface of said first mechanical heating device has been displaced to its end position, said concave abutment surface of said second mechanical heating device, having a temperature below the glass transition temperature (Tg) of said thermoplastic material, is displaced to a working position in which said concave abutment surface forms a gap with said convex forming surface, having a gap width which, in each region of said gap, amounts at most to the thickness of said thermoplastic material before said concave abutment surface is brought into contact with said thermoplastic material.

* * * * *